April 26, 1966 G. MICKAS 3,247,980
MEANS FOR TRANSPORTING WORKPIECES TO AND FROM
A WORK STATION
Filed June 2, 1964 6 Sheets-Sheet 1
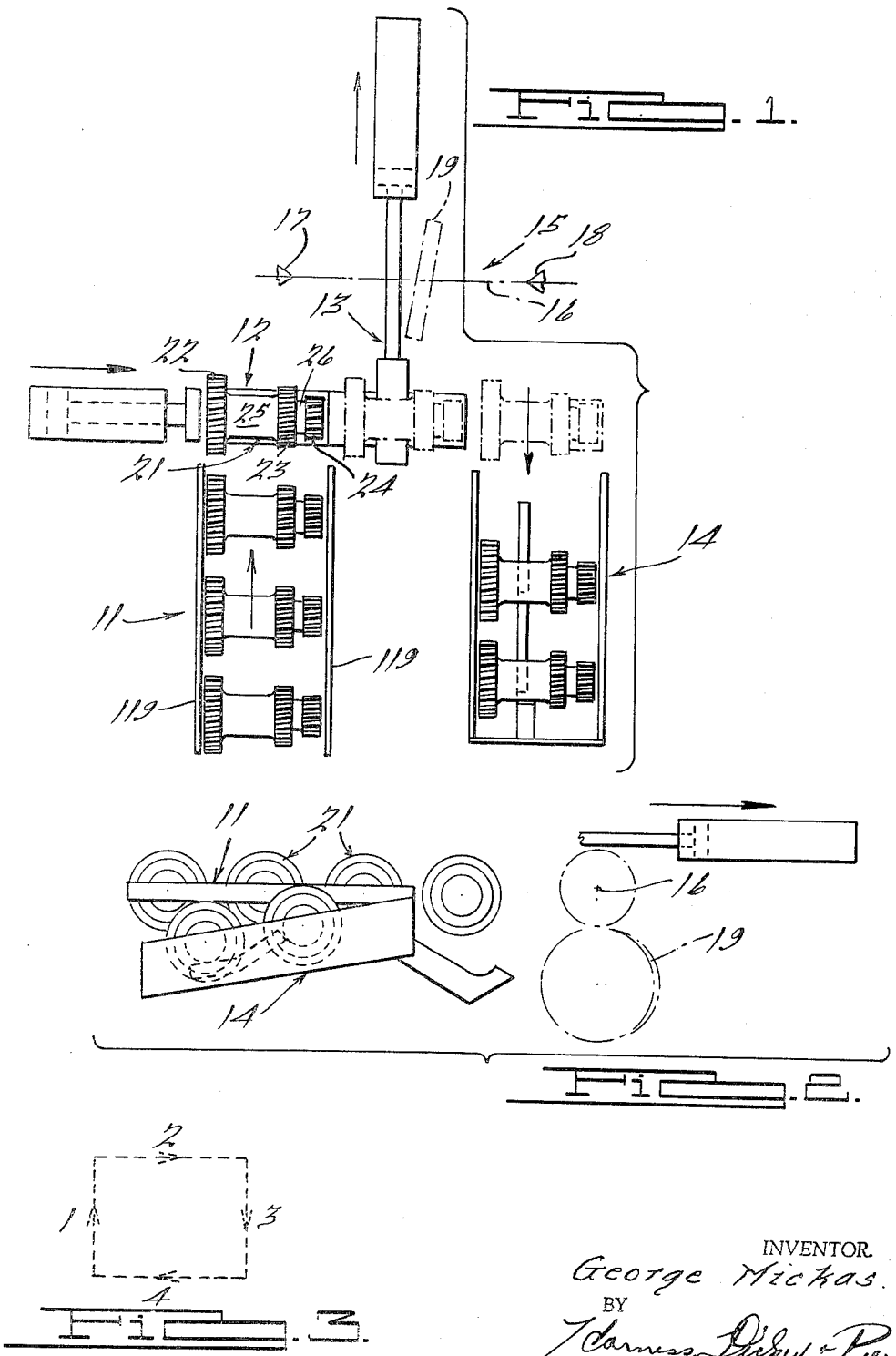
INVENTOR.
George Mickas.
BY
Harness, Dickey & Pierce.
ATTORNEYS

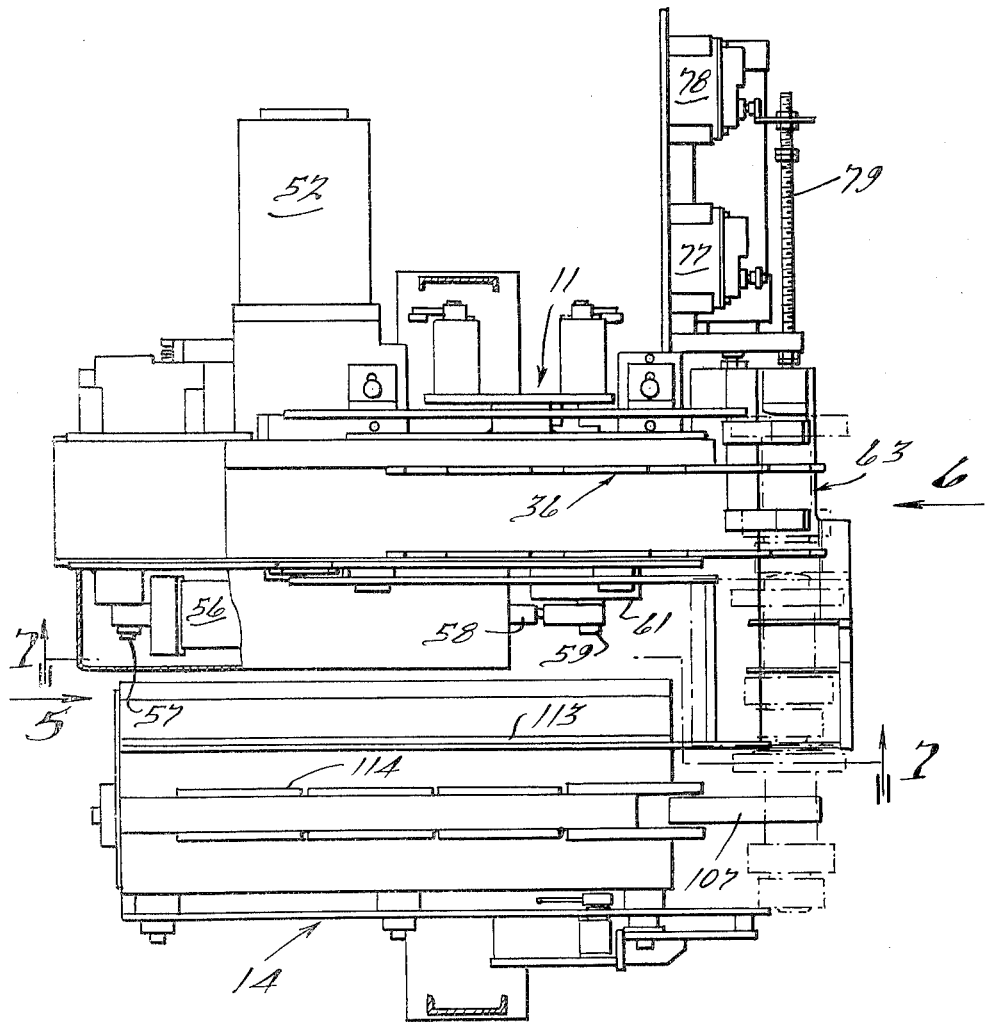

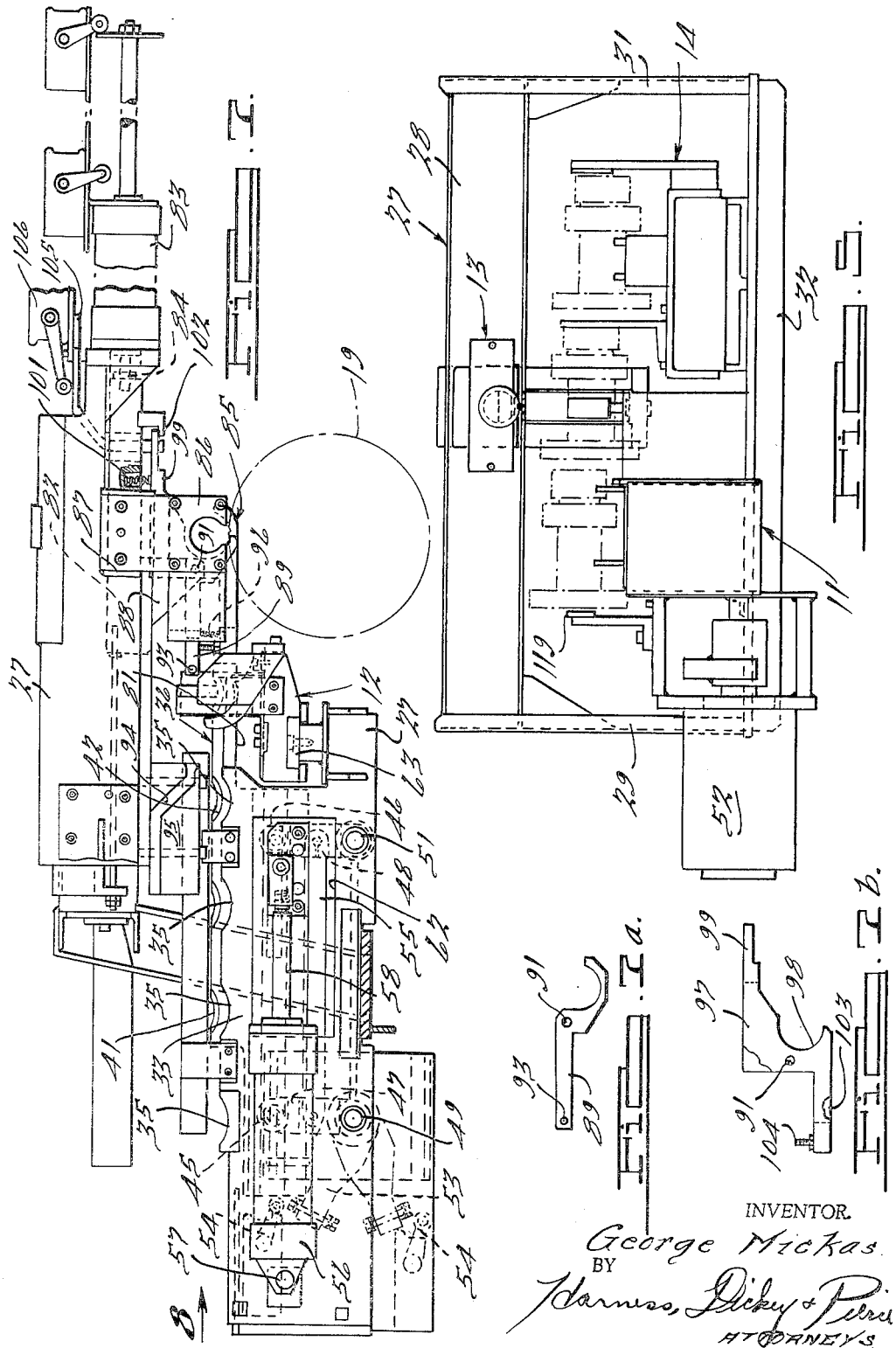

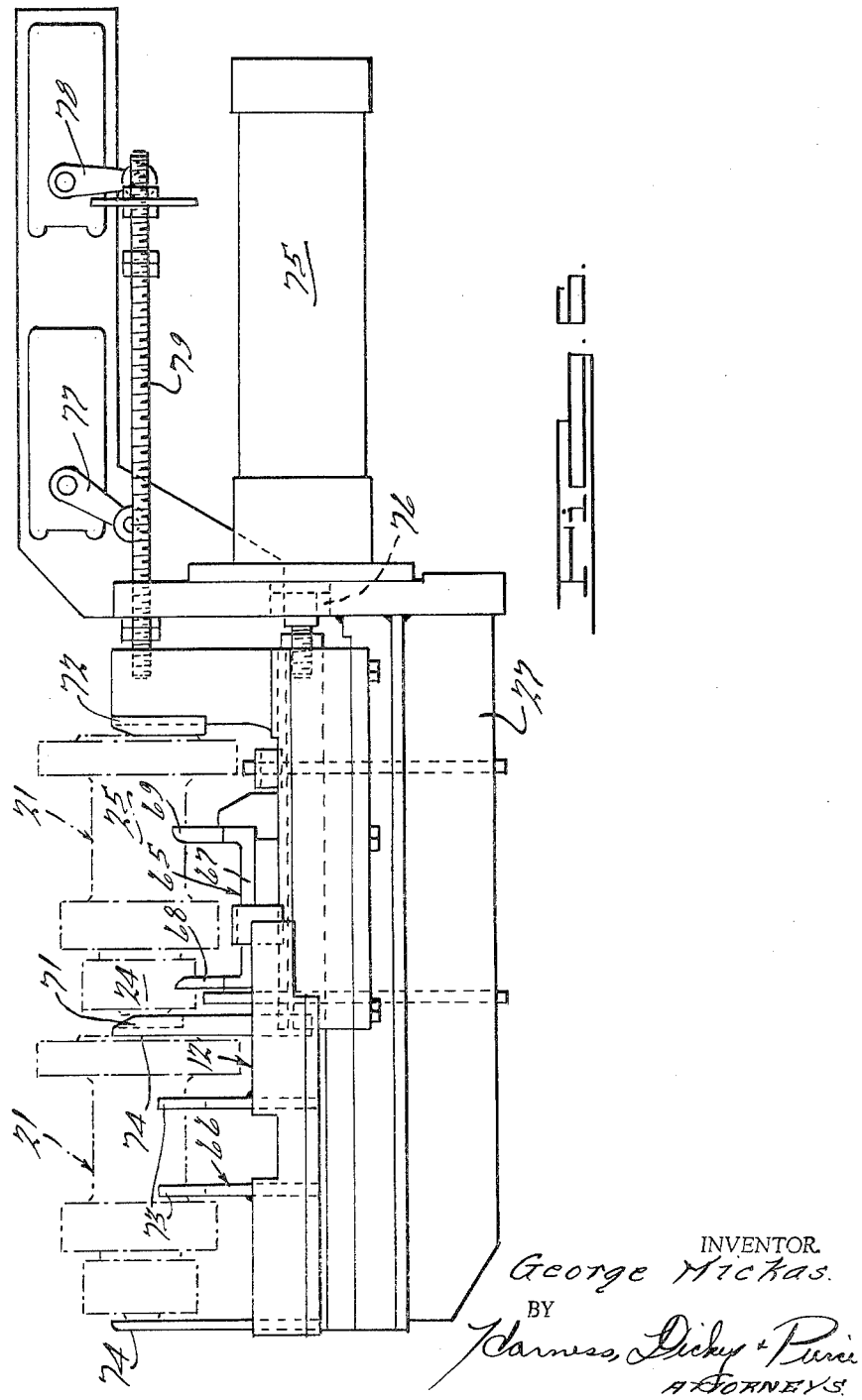

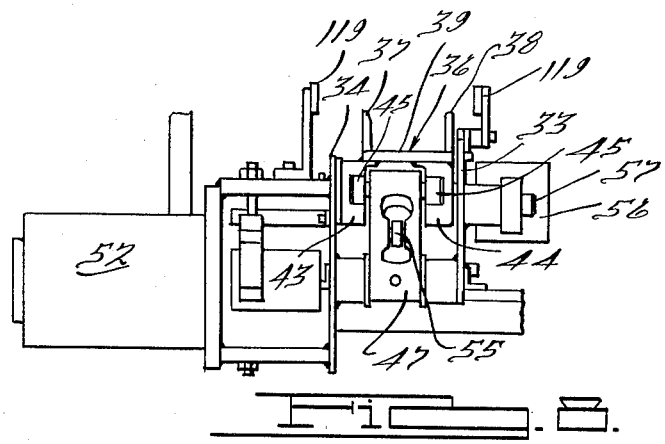
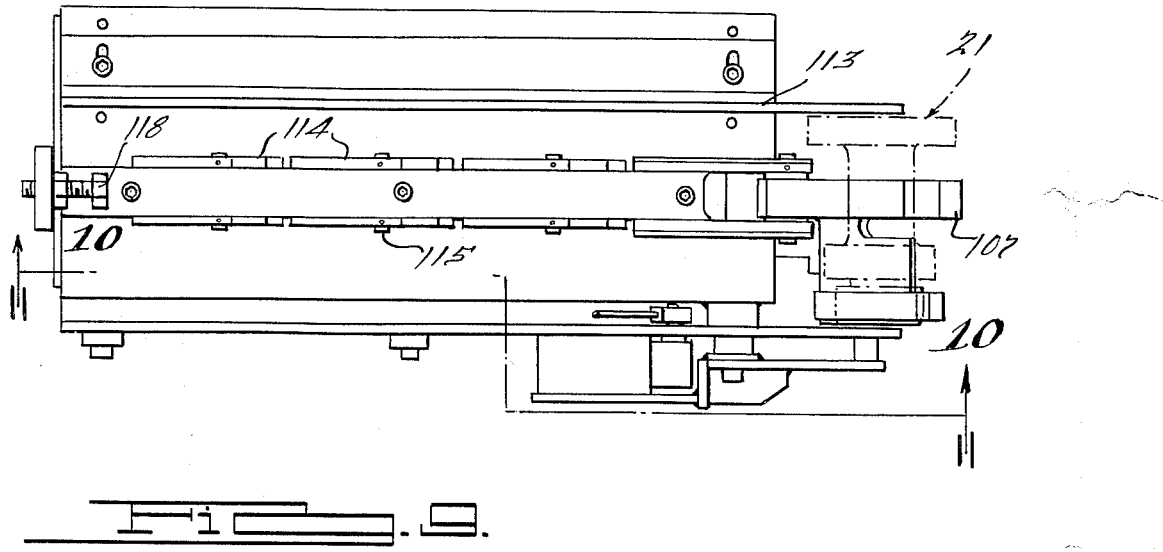

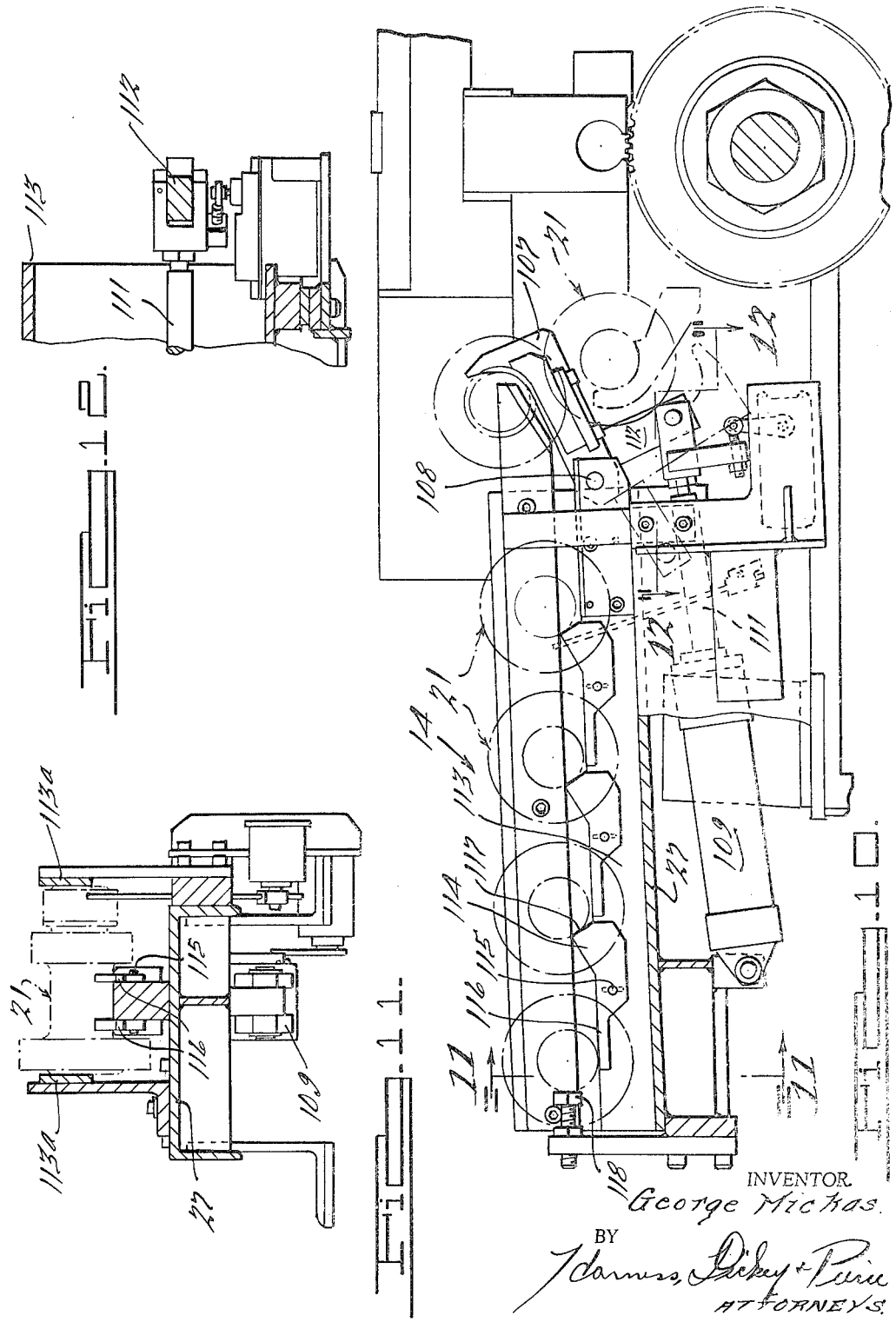

United States Patent Office 3,247,980
Patented Apr. 26, 1966

3,247,980
MEANS FOR TRANSPORTING WORKPIECES TO AND FROM A WORK STATION
George Mickas, Grosse Pointe Woods, Mich., assignor to Michigan Tool Company, Detroit, Mich., a corporation of Delaware
Filed June 2, 1964, Ser. No. 372,039
10 Claims. (Cl. 214—1)

This invention relates to parts loaders for machine tools, and more particularly to a method and means for successively feeding workpieces such as cluster gears into a work station having a gear shaver or similar tool, and removing the shaved gears from the work station.

It is an object of the invention to provide a method and apparatus of this nature which are adapted for automatic operation and greatly increase the rate of speed with which parts are fed to and removed from the work station.

It is another object to provide an improved apparatus of this character in which the cluster gear teeth are protected from damage during the transfer operations.

It is a further object to provide an improved loading and unloading apparatus of this nature which has an extremely compact arrangement and is sturdy and reliable in use.

Other objects, features and advantages of the present invention will become apparent from the subsequent description, taken in conjunction with the accompanying drawings.

In the drawings:

FIGURE 1 is a partially schematic layout of the cluster gear loader showing the location of the various stations;

FIGURE 2 is an elevational schematic view of the layout, parts being omitted;

FIGURE 3 is a diagram showing the successive motions of the walking beam at the feeding station;

FIGURE 4 is a plan view of the assembly;

FIGURE 5 is an end elevational view of the assembly looking in the direction of the arrow 5 of FIGURE 4;

FIGURE 6 is an end elevational view, looking in the direction of the arrow 6 of FIGURE 4 and showing the construction of the transfer shuttle;

FIGURE 7 is a cross-sectional view in elevation taken along the line 7—7 of FIGURE 4, and showing the actuating mechanism for the walking beam as well as the construction of the transfer and loading shuttles;

FIGURE 7a is a detail view showing the shape of the loading-unloading shuttle finger;

FIGURE 7b is a detail view showing the shape of the safety plate;

FIGURE 8 is an end elevational view taken in the direction of the arrow 8 of FIGURE 7 and showing further the construction of the actuating means for the walking beam;

FIGURE 9 is a plan view of the unloading station;

FIGURE 10 is a cross-sectional view taken on the line 10—10 of FIGURE 9 and showing the actuating means for the unloading finger;

FIGURE 11 is a cross-sectional view taken on the line 11—11 of FIGURE 10 and showing the guide means for the workpieces at the unloading station; and FIGURE 12 is a cross-sectional view taken along the line 12—12 of FIGURE 10 and showing the connection between the piston rod and the unloading finger crank.

Briefly, the illustrated embodiment of the invention is adapted to successively feed gear cluster workpieces to a work station at which one of the gears is shaved, and remove the workpieces from this station. The device comprises a feed station, a loading-unloading station, and a discharge station adjacent the work station, the latter being provided with the conventional head and tail stocks between which the work is clamped along a predetermined axis for engagement with the tool. Each of the feed, loading-unloading, and discharge stations extends in a direction which is at right angles to the work station axis; that is, the feed, loading-unloading and discharge stations are in parallel relation. A transfer shuttle is provided for transferring workpieces from the feed station to the loading-unloading station and from the loading-unloading station to the discharge station, this transfer shuttle being disposed between the feed and discharge stations on the one hand and the work station axis on the other hand, and being reciprocable in a direction parallel to the work station axis.

The feed station comprises a pair of stationary parallel rest rails having recesses for supporting the parts to be machined in spaced relation, and a pair of "walking beams" consisting of movable rails having similar recesses and movable in a rectangular path so as to periodically lift the workpieces resting on the stationary rails, advance them a distance equal to that between adjacent workpieces, and lower them so as to again rest on the stationary rails, except for the forwardmost workpiece which will be placed on the transfer shuttle. The transfer shuttle consists of a carriage having forward and rear sections for supporting two workpieces in tandem relation, and the reciprocable stroke of the transfer shuttle is of a distance equal to that between corresponding portions of two workpieces resting thereon. The workpieces are placed by the walking beam on the rear section of the shuttle considered in the direction of its advancing movement from the feed station to the loading-unloading shuttle station.

After the forwardmost workpiece has been placed on the transfer shuttle, it will be advanced so that this workpiece will be at the loading-unloading station. A loading-unloading shuttle at this station consists of a plate and a pivoted retaining finger, the plate and finger coacting to retain a workpiece, remove it from the shuttle and transfer it to the work station. More particularly, the plate and finger are movable from a position between the feed and discharge stations toward the work station, and as they so move, the plate, which is forked and has recesses opening toward the transfer shuttle, will engage the workpiece, while the finger is pivoted to support the underside of the workpiece. The plate and finger loosely retain the workpiece while it is placed in position at the work station, held by the head and tail stocks and machined by the tool. Means are provided on the plate for actuating a safety switch should the teeth on a gear workpiece fail to properly mesh with a gear shaving tool. After the workpiece has been removed from it by the loading-unloading shuttle, the transfer shuttle will be retracted to its former position.

While this is being done, the walking beam is being retracted beneath the workpieces which rest on the stationary rails, and is then moved upwardly to again lift the parts from the stationary rails and index them forwardly, placing the next cluster gear on the rear portion of the returned transfer shuttle. When the machining cycle has been completed, the loading-unloading shuttle will return the machined workpiece to the transfer shuttle, but since the transfer shuttle has been retracted, the machined workpiece will be placed on the forward section of the transfer shuttle. The transfer shuttle, now carrying two workpieces, will again be advanced, and the finished part will thereby be transported into alignment with the discharge station. This station comprises an inclined ramp onto which the parts are rolled by a pivoted finger which lifts them off the transfer shuttle, and stop means are provided on the rails for preventing successively discharged gear clusters from coming into engagement with each other. Meanwhile, and preferably simultaneously with the swinging of the discharging finger, the empty loading-unloading shuttle will again be moved toward the work station, removing the next workpiece from the rear section of the transfer shuttle and transporting it toward the work station. The empty transfer shuttle will again be retracted, the discharging finger also being retracted out of the path of the transfer shuttle in readiness for discharging the next finished workpiece. A highly efficient arrangement is thus provided wherein workpieces are being placed in position for loading into the work station at about the same that previously machined parts are being unloaded from the work station, and parts are actually loaded into the work station at the same time that other parts are discharged from the apparatus.

Referring more particularly to the drawings, FIGURE 1 shows the general layout of the apparatus, with a feed station generally indicated at 11, a transfer shuttle generally indicated at 12, a loading-unloading station generally indicated at 13, and a discharge station generally indicated at 14. The apparatus is intended to transfer parts to and from a work station generally indicated at 15 having a work station axis indicated in dot-dash lines at 16 with head and tail stocks 17 and 18 respectively. A shaving cutter 19 is mounted at the work station, the shaving cutter being rotatable on an axis angularly displaced from axis 16 in accordance with conventional practice. The workpieces which are to be processed are generally indicated at 21 and comprise cluster gear members having gear faces 22, 23 and 24 of varying diameters and in spaced parallel relation, with a relatively long shaft section 25 between gears 22 and 23 and a relatively short shaft section 26 between gears 23 and 24.

As will be seen from FIGURES 1 and 2, feed station 11, loading-unloading station 13 and discharge station 14 are adapted to move workpieces 21 in directions parallel to each other and perpendicular to axis 16. More particularly, stations 11 and 14 are on one side of axis 16 (below axis 16 in FIGURE 1 and to the left of axis 16 in FIGURE 2) while the movement of loading-unloading station 13 is on a line disposed between stations 11 and 14, the purpose of station 13 being to pick up workpieces transported to it from station 11 by transfer shuttle 12 and return parts from work station 16 to the transfer shuttle so that they may be transported to discharge station 14. Transfer shuttle 12 is disposed between stations 11 and 14 on the one hand and axis 16 on the other end, and is reciprocable along a line parallel to axis 16.

The parts are mounted on a main frame generally indicated at 27 in FIGURE 5, the frame having a rectangular shape with an upper beam 28, vertical members 29 and 31, and a lower supporting member 32. The construction of feed station 11 is shown in FIGURES 3, 4, 5, 7 and 8. This station comprises a pair of stationary parallel rails 33 and 34, seen in FIGURES 4 and 7, the rails comprising vertically disposed plates with their upper edges having spaced arcuate recesses 35 to accommodate and retain parts 21 in evenly spaced relation along the rails.

Four pairs of recesses 35 are shown in the figures, so that four workpieces 21 may be supported at any one time on rails 35. A walking beam generally indicated at 36 is disposed between rails 33 and 34, the walking beam comprising a pair of rails 37 and 38, as seen in FIGURE 8, which are disposed between rails 33 and 34, rails 37 and 38 being secured together in parallel relation by lower member 39. Rails 37 and 38 have arcuate recesses 41 and 42 respectively, recesses 41 being in rail 37 and recesses 42 being in rail 38. These recesses are similar to recesses 35 for releasably retaining workpieces 21 in spaced relation, each pair of recesses 41 and 42 being aligned, with the pairs spaced apart the same distance as the pairs of recesses 35, four pairs of recesses 41 and 42 being provided.

Members 37, 38 and 39 are supported by a pair of parallel bars 43 and 44, seen in FIGURE 8, these bars being disposed between and guided by members 33 and 34. Bars 43 and 44 are channel-shaped with their recesses facing each other, and they are supported by two pairs of rollers 45 and 46, seen in FIGURES 7 and 8, these rollers being disposed within the facing recesses of the bars and being slidably guided thereby. The rollers are in turn supported by the outer ends of arms 47 and 48 respectively, the lower ends of these arms being mounted on pivots 49 and 51 respectively, which pivots extend transversely to plates 33 and 34, as seen in FIGURES 7 and 8.

Means are provided for simultaneously rocking arms 47 and 48 between substantially vertical upper positions as seen in FIGURE 7 and lower positions which are about 45° counterclockwise of the positions of FIGURE 7. This means comprises a rocking actuator 52 of a conventional type, seen in FIGURES 4 and 8, this actuator being mounted on the side of frame 27 and causing periodic oscillation of shaft 49 by a connection therewith. A stop 53, seen in FIGURE 7, is fixed on shaft 49 and is adapted to actuate limit switches 54 and 55 for reversing the motion of actuator 52. A link 55 connects arms 47 and 48 so that arm 48 will follow the motion of arm 47 with a resulting parallelogram action. It will be seen that with arms 47 and 48 in the clockwise or upper position of FIGURE 7, the recesses of walking beam 36 will be raised above the level of the recesses 35 in stationary rails 33 and 34, whereas in the retracted or counterclockwise position of arms 47 and 48, the level of recesses 41 and 42 will be below the level of recesses 35. In other words, arms 47 and 48 will serve to raise and lower walking beam 36.

This is indicated schematically in FIGURE 3, which shows the four motions of walking beam 36 in sequence, numbered 1, 2, 3 and 4. Arms 47 and 48 will create motions 1 and 3. In order to do this, beam 36 must of course be held against horizontal motion with respect to rails 33 and 34 while arms 47 and 48 are swinging, so that rollers 45 and 46 will ride in the facing recesses of bars 43 and 44. This is accomplished by a cylinder 56, seen in FIGURES 4 and 7, the head of which is pivotally connected at 57 to frame 27, the piston rod 58 which extends from the cylinder being pivotally connected at 59 to a block 61 which is secured to walking beam 36 and extends through an opening 62 in plate 33. Piston rod 58 will be reciprocated while arms 47 and 48 are held stationary so that rollers 45 and 46 act as horizontal guides for walking beams 39. This will achieve motions 2 and 4 in FIGURE 3.

The sequence will thus be first to raise walking beam 39 while in its rearward position (piston rod 58 retracted) by swinging arms 47 and 48 clockwise to their FIGURE 7 position (motion 1 in FIGURE 3), then holding arms 47 and 48 stationary while advancing piston rod 58 (motion 2), then holding piston rod 58 extended while rocking arms 47 and 48 counterclockwise (motion 3), and then holding arms 47 and 48 stationary while retracting piston rod 59 (motion 4). The result of this will be to pick up four workpieces 21 which rest on rails 33 and 34, advance them a distance between adjacent workpieces, and lower them again, all but the forwardmost workpiece being again lowered onto rails 33, 34. The forwardmost workpiece will be lowered onto transfer shuttle 12, best seen in FIGURES 4, 6 and 7.

This shuttle is slidably supported on a track 63, seen in FIGURE 7, which is mounted on frame 27 and extends transversely to rails 33 and 34, that is, parallel to work station axis 16. As best seen in FIGURE 6, transfer shuttle 12 has two workpiece-retaining sections, these being indicated generally at 65 and 66 respectively. Station 65 might be referred to as the unfinished workpiece supporting section whereas 66 is a finished workpiece supporting section. These sections are in tandem relation and are so constructed as to support two workpieces 21 coaxially and parallel to axis 16. Section 65 comprises a channel-shaped member 67 having upwardly extending arms 68 and 69 adapted to engage and cradle gear surface 24 and shaft portion 25 respectively, of each workpiece.

A pair of end plates 71 and 72 are provided on shuttle 12 for holding workpiece 21 in section 65. Section 66 likewise comprises a pair of upstanding members 73 which will cradle portion 25 of a workpiece 21. It will be noted that in section 66 no engagement is made with the finished gear tooth surfaces. Guide surfaces 74 are provided for axially locating workpiece 21 so that it will be aligned with loading shuttle station 13, in order that the loading shuttle may engage portion 25 of workpiece 21 between cradle supports 73, as later described.

The means for actuating shuttle 12 comprises a cylinder 75 secured to frame 27, as seen in FIGURE 6, and a piston rod 76 which is secured to one end of shuttle 12, the shuttle riding on the track 63 as described above. A pair of limit switches 77 and 78 are provided adjacent shuttle 12, these being actuated by movement of a rod 79 secured to shuttle 12 above cylinder 75, as seen in FIGURE 6. These limit switches serve to control the stop positions of the shuttle in either direction.

As will be seen in FIGURE 7, the forward lower portion of walking beam 36 is recessed as indicated at 81, so that the forwardmost arcuate recesses 41 and 42 are on a relatively narrow portion of the walking beam. The relative heights of walking beam 36 and shuttle 12 are such that when the walking beam moves forward (motion 2 in FIGURE 3) it will carry forwardmost workpiece into a position immediately above section 65 of shuttle 12, the walking beam clearing shuttle 12 due to recess 81. Motion 3 of walking beam 36 will cause the forwardmost workpiece 21 to be gently lowered onto section 65 of shuttle 12, with the walking beam being withdrawn downwardly from the workpiece sufficiently so that motion 4 of walking beam 36 will cause withdrawal of the walking beam from under the workpiece. The path of movement of shuttle 12 will therefore not be obstructed.

The construction of loading-unloading station 13 is perhaps best seen in FIGURE 7, and comprises a slide 82 movably mounted on frame 27 and actuated by a cylinder 83, with a piston rod 84 connected to the end of slide 82 facing away from feed station 11. Slide 82 is adapted to move along a path parallel to feed station 11, cylinder 83 being mounted on the side of tool 19 opposite that on which feed station 11 is mounted. Slide 82 carries a loading-unloading shuttle generally indicated at 85 and movable between a position to the left of transfer shuttle 12, as seen in FIGURE 7, and a position over tool 19. When in the latter position, a workpiece 21 carried by shuttle 85 will be disposed between a pair of guide plates 86 secured to milled pads 87 on frame 27 and extending downwardly therefrom.

Shuttle 85 is adapted to pick up a workpiece 21 resting on section 65 of transfer shuttle 12, carry the workpiece to work station axis 16 for machining and hold it there while it is being machined, and then return the workpiece onto section 66 of transfer shuttle 12. For this purpose shuttle 85 is provided with a downwardly extending bracket 88 on which is pivotally mounted a finger 89, the shape of this finger being shown in FIGURE 7a with the pivot indicated at 91. The forward portion 92 of finger 89 is curved upwardly, and the rear portion has a pin 93 which is receivable by a cam slot 94 of a fixed block 95. The shape of slot 94 is such that when pin 93 enters it when moving in a rearward direction, shuttle 85 will be over transfer shuttle 12 and the finger will be swung clockwise in FIGURE 7 against the action of a tension spring 96 connecting finger 89 with a safety plate 97, best seen in FIGURE 7b. This will cause portion 92 of finger 89 to be retracted below the level of the workpiece 21 which is being carried by the shuttle so that the workpiece may drop onto section 66 of shuttle 12. Likewise, when shuttle 85 is moving from its left hand position rightwardly toward the position of FIGURE 7, finger 89 will be swung counterclockwise about pivot 91 by cam slot 94 so that it will come under and pick up a workpiece 21 carried by section 65 of shuttle 12.

Safety plate 97 is also pivoted on pivot 91, and its main portion is of forked construction, finger 89 being disposed between the forked portions of safety plate 97. The safety plate has an arcuate portion 98 which opens forwardly, that is, away from feed station 11, and is therefore adapted to engage portion 25 of a workpiece 21 resting on section 65 of shuttle 12 when shuttle 85 advances toward its right hand position shown in FIGURE 7. The counterclockwise swinging of finger 89 will thus cause portion 92 of finger 89 to coact with arcuate portions 98 of safety plate 97 to loosely but positively retain workpiece 21 in position. The loose retention is so that the workpiece may be rotated during the machining process.

Safety plate 97 has a forward extension 99 at its upper portion, and a compression spring 101 is disposed between this extension and slide 82. A stop 102 is provided for limiting the clockwise movement of safety plate 97, stop 102 coacting with the end of extension 99, as seen in FIGURE 7. A rearward extension 103 is provided at the lower end of safety plate 97 and an upward projection 104 on this extension is engageable with the underside of the rearward portion of finger 89. Should workpiece 21 fail to properly engage tool 19, that is, with tool 19 as a shaving cutter, should the workpiece teeth fail to mesh properly with the shaving cutter teeth, safety plate 97 will swing counterclockwise from its FIGURE 7 position. A rod 105 is secured to and extends upwardly from extension 99 of safety plate 97 and is engageable with the arm of a safety switch 106, so that the safety switch may cause shuttle 85 to return to its left hand position and again attempt to properly locate the workpiece by moving to the right.

The construction of discharge station 14 is perhaps best seen in FIGURES 9 to 12. The station comprises an unloading finger 107 which is swingable between the dot-dash and solid line positions of FIGURE 10, being pivoted at 108 on an axis parallel to the movement of transfer shuttle 12. Finger 107 is so shaped that it will engage a workpiece 21 supported by members 73 and 74 of transfer shuttle section 66. It should be observed in this connection that rests 73 and 74 are so shaped as to permit workpiece 21 to be placed on them when shuttle 85 moves rearwardly in FIGURE 7. Finger 107 is actuated by a cylinder 109 having one end fixed to frame 107 and a piston rod 111 pivotally connected to an arm 112 extending from finger 107. A ramp 113 is disposed adjacent finger 107 so that when the finger swings upwardly to its solid line position in FIGURE 10, workpiece 21 will roll onto the ramp guided by rails 113a.

The ramp is provided with stops 114 to prevent successive workpieces from hitting each other as they are placed on the ramp. These stops are weighted so as to normally be in a clockwise position, being pivoted at 115 on ramp 113, but when a workpiece 21 rolls past the pivot of each stop it will depress an upwardly extending finger 116 on the forward portion of the stop to swing the stop to a counterclockwise position. In this position, an abutment 117 on the rear portion of the stop will be raised so that the next workpiece 21 will hit this abutment before it hits the workpiece ahead of it. The stops are so spaced that each will hold a workpiece over the forward portion of the stop behind it, thus automatically spacing the discharged workpieces, an abutment 118 being provided for holding the first workpiece over the first stop.

In operation, workpieces 21 will be placed on feed station 11 between a pair of parallel guides 119 so as to rest in recesses 35 of rails 33. It may be assumed for purposes of the description that four workpieces rest in recesses 35 and that transfer shuttle 12, loading-unloading shuttle 85 and discharge station 14 do not have any workpieces. Transfer shuttle 12 will be in its left hand position as seen in FIGURE 1, and walking beam 36, being in its lower and retracted position, will first carry out motion 1 in FIGURE 3, this motion being created by clockwise rocking of arms 47 and 48 in FIGURE 7. The four workpieces 21 will be lifted from rails 37 and 38 by the walking beam, resting in recesses 41 and 42 thereof. The walking beam will then carry out motion 2 in FIGURE 3, this motion being created by the forward movement of piston rod 58. This will carry the forwardmost workpiece 21 over section 65 of transfer shuttle 12. Counterclockwise rocking of arms 47 and 48 will then lower the walking beam (motion 3 in FIGURE 3) so that the forwardmost workpiece will come to rest on supports 68 and 69 of transfer shuttle 12, the other three workpieces coming to rest on rails 37 and 38, but indexed forward from their previous positions a distance equal to the spacing between the workpieces. The walking beam now goes through motion 4 of FIGURE 3 by retraction of piston rod 58.

Transfer shuttle 12 will be advanced by piston rod 76 until the workpiece 21 thereon comes into alignment with loading-unloading station 13. At this time, loading-unloading shuttle 85 will be in its extreme left hand position (FIGURE 7 shows it in the extreme right hand position), that is, to the left of and in non-obstructing relation with the transfer shuttle, with finger 89 being rocked clockwise by the presence of pin 93 in cam slot 94, so that finger portion 92 is retracted downwardly. The loading-unloading shuttle will be advanced by retraction of piston rod 84, safety plate portions 98 engaging the workpiece while finger 89 is swung counterclockwise by pin 93 riding downwardly in cam slot 94. The workpiece will be lifted off the transfer shuttle and carried to work station axis 16, where machine tool 19 will machine the part while it is held by head stock 17 and tail stock 18 and loosely retained by loading shuttle 85. After loading-unloading shuttle 85 has cleared transfer shuttle 12, the transfer shuttle will be retracted to its left hand position in FIGURE 1. The walking beam will again go through motions 1, 2, 3 and 4 so as to place another workpiece 21 on section 65 of transfer shuttle 12.

At the same time, upon completion of the machining cycle, head stock 17 and tail stock 18 will release the workpiece, and piston rod 84 will be extended to move loading-unloading shuttle 85, with the workpiece, to the left in FIGURE 7. As the loading-unloading shuttle passes over section 66 of transfer shuttle 12, finger 89 will again be swung clockwise by pin 93 and cam slot 94, releasing the finished workpiece onto support 73 and 74. After loading-unloading shuttle 85 clears the transfer shuttle, the latter will again be advanced, positioning the unfinished part at the loading-unloading station and the finished workpiece at the discharge station. Finger 107 will be raised by piston rod 111, lifting the workpiece off shuttle 12 and placing it on ramp 113. At the same time, loading-unloading shuttle 85 will remove the unfinished workpiece from the transfer shuttle and move it to the work station axis in the same manner as before. The empty transfer shuttle will again be retracted to the left in FIGURE 1, and finger 107 will be lowered preparatory to removing the next finished workpiece.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In an apparatus for transporting workpieces to and from a work station, a feed station, means at said feed station for stationarily supporting several workpieces in evenly spaced relation, means at said feed station for simultaneously indexing said workpieces in one direction a distance equal to that between adjacent workpieces, a transfer shuttle having rear and forward sections for supporting two workpieces in tandem, said last-mentioned means at the feed station coacting with said transfer shuttle whereby the forwardmost workpiece will be placed on the rear section thereof, means for moving said transfer shuttle a predetermined distance in a direction perpendicular to said first-mentioned direction, a loading-unloading station having a shuttle engageable with a workpiece on the rear section of said advanced transfer shuttle for transporting said workpiece to and from the work station in a direction perpendicular to the transfer shuttle movement direction, means for returning said transfer shuttle after the workpiece has been removed therefrom by the loading-unloading shuttle whereby the forward section of the transfer shuttle is at the loading-unloading station and the rear section is aligned with the feed station, said indexing means being adapted to again advance said feed station workpieces a distance equal to that between adjacent workpieces so that the forwardmost workpiece is again placed on the rear section of the transfer shuttle, means at the loading-unloading station for returning the finished workpiece from the work station to the forward section of the transfer shuttle, said transfer shuttle moving means being adapted to again advance the transfer shuttle whereby the new workpiece on the rear section thereof is aligned with the loading-unloading station, a discharge station aligned with the finished workpiece on the forward transfer shuttle section when the transfer shuttle is advanced, and means at said discharge station for removing the finished workpiece from said transfer shuttle.

2. The combination according to claim 1, said means at the feed station for stationarily supporting said workpieces comprising a pair of rails having evenly spaced workpiece retaining recesses, said means at the feed station for indexing said workpieces comprising a walking beam having rails parallel to said stationary rails, recesses on said walking beam rails for retaining workpieces, and means for moving said walking rails successively between a lower rear position in which the walking beam is out of engagement with the workpieces, an upper rear position in which the walking beam lifts the workpieces off the stationary rails, an upper forward position in which the walking beam advances the workpieces, and a lower forward position in which the walking beam lowers all the workpieces except the forwardmost workpiece onto the stationary rails and lowers the forwardmost workpiece onto the transfer shuttle.

3. The combination according to claim 2, said means for moving the walking beam comprising a plurality of arms pivoted on axes perpendicular to the extent of the walking beam, means for oscillating said arms in parallelogram fashion between lower and upper positions, said walking beam rails being slidably supported by the outer ends of said arms, and means for reciprocating said walking beam rails independently of the positions of said arms.

4. The combination according to claim 1, said transfer shuttle being slidably mounted on a track extending at right angles to the extent of said feed station rails, the two sections of said transfer shuttle each having means for releasably retaining a workpiece, said walking beam having a forward portion projectible over the rear section of said transfer shuttle when the walking beam is in its forward position, the workpiece supporting means on the rear transfer shuttle section and the walking beam being in non-obstructing relation when the walking beam is lowered, whereby the forwardmost workpiece on the walking beam will be lowered onto the rear section support of the transfer shuttle.

5. The combination according to claim 1, said loading-unloading shuttle comprising a slide mounted for movement in a direction perpendicular to the work station axis, first workpiece engaging means carried by said slide and open in a direction facing said work station axis, second workpiece engaging means on said slide mounted for movement between a holding position in which a workpiece engaged by said first workpiece engaging means will be held against substantial movement and a releasing position in which a workpiece engaged by said first workpiece engaging means may drop onto said transfer shuttle, means for reciprocating said slide, and cam means coacting with said second workpiece engaging means when the latter is moved in a direction away from said work station axis toward said transfer shuttle to move the second workpiece engaging means to its releasing position as the workpiece held thereby passes over said transfer shuttle.

6. The combination according to claim 5, said first workpiece engaging means comprising a plate mounted on said slide and having a forwardly facing arcuate recess for engagement with the workpiece, said second workpiece engaging means comprising a finger pivoted on said slide and having an upwardly facing arcuate recess coacting with the arcuate recess of said plate when the finger is in its holding position to loosely retain a workpiece, said cam means comprising a fixed cam, and a portion on said finger engageable with said cam to move the finger between its holding and released positions.

7. The combination according to claim 6, said plate being pivotally mounted on said slide, a stop for limiting the movement of said plate in one direction, first resilient means urging said plate against said stop, switch actuating means carried by said plate and operative when the plate moves away from said stop with said loading-unloading shuttle at said work station, and means yieldably retaining said plate and finger in a predetermined relative position.

8. The combination according to claim 1, said discharge station comprising an inclined ramp, a finger pivotally mounted adjacent the upper end of said ramp, and means for rocking said finger, the finger having a lower position clear of said transfer shuttle and being swingable from the lower position to an upper position in which it lifts a workpiece supported by the forward section of said transfer shuttle and moves it onto said ramp.

9. The combination according to claim 8, said ramp being further provided with a series of pivoted stops having rear portions with a normal position permitting unobstructed movement of workpieces along said ramp and forward portions normally projecting above the ramp but being depressible in response to engagement by a workpiece to raise the rear portion to an obstructing position, whereby the next workpiece will be stopped before it engages the workpiece which moves the ramp stop, the ramp stops being so spaced that said next workpiece will be stopped in a position depressing the forward portion of the next ramp stop, and an abutment for holding the first discharged workpiece over the forward portion of the first ramp stop.

10. In a device for loading and unloading identical axially extending parts with respect to a work station having a predetermined axis, a feed station, a loading-unloading station and a discharge station in spaced parallel relation perpendicular to the work station axis, said feed station comprising means for releasably retaining workpieces in evenly spaced relation with their axes parallel to the work station axis, a walking beam at said feed station comprising means for simultaneously lifting the workpieces at the feed station from said retaining means, moving them forwardly toward said work station axis a distance equal to the distance between adjacent workpiece axes, and lowering them so that all but the forwardmost workpiece again rest on the retaining means, a transfer shuttle riding on a track extending parallel to the work station axis and between the feed station on the one hand and the work station axis on the other hand, said transfer shuttle having forward and rear sections each being capable of supporting a workpiece so that the two workpieces are in tandem when both sections are loaded, means for reciprocating said transfer shuttle between a first position in which the rear section is aligned with the feed station and the forward section is aligned with the loading-unloading station, and a second position in which the rear section is aligned with the loading-unloading station and the forward section is aligned with the discharge station, said loading-unloading station comprising a loading-unloading shuttle, means for reciprocating said loading-unloading shuttle in a direction perpendicular to the work station axis between positions adjacent the work station axis and adjacent the transfer shuttle, said loading-unloading shuttle having means engageable with the workpiece on the rear transfer shuttle section when the loading-unloading shuttle moves toward said work station axis to remove the workpiece from the transfer shuttle and loosely retain it adjacent the work station, said last-mentioned means also including means for releasing the loosely retained workpiece onto the forward section of the transfer shuttle in response to movement of the loading-unloading shuttle from the work station axis to the transfer shuttle, said discharge station comprising a ramp, and a finger movable from a retracted position out of obstructing relation with said transfer shuttle to a discharge position in which it engages a workpiece on the forward section of the transfer shuttle and moves it onto said ramp.

References Cited by the Examiner
UNITED STATES PATENTS

| | | |
|---|---|---|
| 2,623,429 | 12/1952 | Meyer. |
| 2,771,716 | 11/1956 | Joyce _____ 51—105 |
| 2,867,058 | 1/1959 | Balsiger _____ 51—105 |
| 2,899,043 | 8/1959 | Young. |

FOREIGN PATENTS

| | | |
|---|---|---|
| 598,619 | 2/1948 | Great Britain. |

MARVIN A. CHAMPION, *Primary Examiner.*